United States Patent [19]

Forsberg et al.

[11] Patent Number: 5,199,828
[45] Date of Patent: Apr. 6, 1993

[54] CUTTING TOOL WITH INSERT AND REMOVABLE LOCKING PIN

[75] Inventors: Karl-Erik Forsberg, Fagersta; Mikael Jansson, Avesta, both of Sweden

[73] Assignee: Seco Tools AB, Fagersta, Sweden

[21] Appl. No.: 794,513

[22] Filed: Nov. 19, 1991

[30] Foreign Application Priority Data

Nov. 21, 1990 [SE] Sweden ............................. 9003705

[51] Int. Cl.$^5$ ............................................. B23B 27/16
[52] U.S. Cl. .................................... 407/104; 407/105
[58] Field of Search ........................ 407/104, 105, 103

[56] References Cited

U.S. PATENT DOCUMENTS

| | | | |
|---|---|---|---|
| 3,341,923 | 9/1967 | Kelm | 407/104 |
| 3,662,444 | 5/1972 | Erkfritz | 407/104 X |
| 3,740,807 | 6/1973 | Getts | 407/104 |
| 3,913,197 | 10/1975 | Wolf | 407/47 |
| 4,397,592 | 8/1983 | Erickson | 407/105 |
| 4,427,322 | 1/1984 | Kröll | 407/105 |
| 4,632,606 | 12/1986 | Lagerberg | 407/104 |
| 4,869,624 | 9/1989 | Viellet | 407/105 X |

FOREIGN PATENT DOCUMENTS

| | | |
|---|---|---|
| 0247011 | 11/1987 | European Pat. Off. |
| 2703696 | 8/1978 | Fed. Rep. of Germany ...... 407/105 |
| 1265012A | 10/1986 | U.S.S.R. |
| 1265012 | 10/1986 | U.S.S.R. .............................. 407/104 |
| 2041797 | 9/1980 | United Kingdom ................ 407/105 |

Primary Examiner—Steven C. Bishop
Attorney, Agent, or Firm—Burns, Doane, Swecker & Mathis

[57] ABSTRACT

A cutting insert is mounted on a holder by means of a locking screw which enables inserts to be exchanged without completely removing the screw from the holder. The insert has a through-hole configured such that a lower end thereof is of cylindrical configuration and includes a tapered section located thereabove. The tapered section expands in cross-section in an upward direction. The locking screw includes a head, the outer surface of which engages the through-hole at diametrically opposite contact locations and imposes a downward force on the insert at each contact location. In one embodiment, the head includes cylindrical surface portions which engage the through-hole at both contact locations. In another embodiment, the head includes a surface expanding in cross-section in an upward direction which engages the through-hole at both contact locations. In a third embodiment, the head includes a cylindrical surface for engaging the through-hole at the first contact location, and an expanding surface for engaging the through-hole at the second contact location.

16 Claims, 4 Drawing Sheets

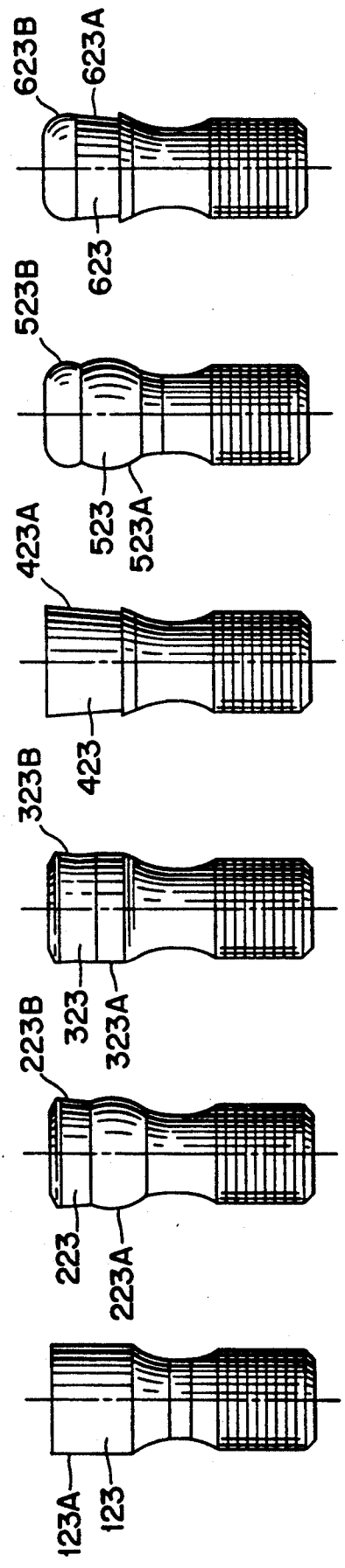

CUTTING TOOL WITH INSERT AND REMOVABLE LOCKING PIN

BACKGROUND OF THE INVENTION

The present invention refers to a cutting tool for chip removing machining.

Such a cutting tool typically includes a holder body with a cutting insert receiving site including a base surface and side supporting means. A cutting insert is located in the cutting insert receiving site and is supported by the base surface and side supporting means. A locking pin is detachably connectable to the holder body in the area of the cutting insert receiving site. The locking pin is axially displaceable relative to the holder body and has a longitudinal center axis diverging away from the side supporting means as it progresses upwardly. The cutting insert has a fixing hole extending through the insert, and the locking pin has a head insertable into the fixing hole. The design of the head and the fixing hole and the inclination of the longitudinal center axis are so mutually adapted to each other that, in an active position of the locking pin, a lower contact portion of the head engages the inner portion of the fixing hole and an upper contact portion of the head engages the outer portion of the fixing hole. Those contact portions are located on opposite sides of the head of the locking pin.

In an inactive position of the locking pin, i.e., the locking pin being displaced axially away from the base surface by a limited distance, the cutting insert can be mounted in or removed from the cutting insert receiving site. That is, it is unnecessary to completely detach the locking pin from the holder in order to exchange cutting inserts.

Cutting tools of the above-mentioned type previously known, see U.S. Pat. Nos. 3,740,807 and 3,913,197.

In the arrangement shown in U.S. Pat. No. 3,740,807 the cutting insert has a cylindrical hole and the longitudinally spaced portions of the locking screw that engage the hole are frusto-conical with decreasing cross-sections in opposite directions. By studying FIG. 2 of that patent, one can see that a lifting force applied to the cutting insert will be counteracted only by friction forces between the locking screw and the hole of the cutting insert.

In the arrangement shown in U.S. Pat. No. 3,913,197, the cutting insert has a hole including two frusto-conical sections converging at the center of the insert. The locking screw is generally of the same design as the locking screw of U.S. Pat. No. 3,740,807. However, when the locking screw engages the upper frusto-conical section of the hole of the cutting insert, a locking force which prevents lifting of the insert will be imposed.

The present invention is primarily related to a cutting tool including a cutting insert having a fixing hole of a standardized configuration, i.e., a hole defined by ISO No. 6987 wherein a lower end of the hole (i.e., an end disposed closest to the base surface of the insert receiving site) is generally cylindrical and adjoins a generally tapered portion thereabove which is of gradually enlarging cross-section in an upward direction. The taper of the tapered portion is to be designed for use with a countersunk head screw having a head taper angle between 40° and 60°. A locking screw according to combination with a hole conforming to ISO 6987, due to the fact that the upper contact portion of the locking screw has a decreasing cross-section towards the upper end of the head of the locking screw. As a result, when using cutting inserts having a through-hole conforming to ISO 6987, it has been heretofore necessary to completely detach the locking pin from the holder in order to exchange inserts.

An object of the present invention is to present a cutting tool having a simple but reliable locking arrangement for a cutting insert having a hole according to ISO 6987 or a similar design, wherein the cutting inserts can be exchanged without completely removing the locking pin from the holder.

SUMMARY OF THE INVENTION

These and other objects are achieved by the present invention which involves a cutting tool for chip removing machining. The cutting tool comprises a holder body having an insert-receiving site which includes a base surface, side supporting surfaces, extending upwardly from the base surface, and an aperture extending downwardly through the base surface and being inclinedly toward the side supporting surface means. A cutting insert is seated on the site and includes a bottom face engaging the base surface. The cutting insert also includes a side face engaging the side supporting surfaces, and a top face having at least one cutting edge. A through-hole extends through the insert from the top face to the bottom face. The through-hole includes a tapered section which is of progressively reduced cross-section in a downward direction. A locking pin is insertable through the through-hole and is securable in the aperture for releasably securing the insert to the holder and permitting the insert to be removed from, and seated upon, the site without completely attaching the pin from the holder. The pin includes a shank receivable in the aperture, and a head receivable in the through-hole. The head includes cylindrically shaped surface portions pressing against the tapered section of the through-hole at diametrically opposite contact locations. One of the contact locations is disposed proximate the side supporting surfaces, and another of the contact locations is disposed remotely from the side supporting surfaces. The head applies a force to the insert at each of the contact locations, each of which forces including a downward component.

In an alternative embodiment of the invention, the portions of the head of the locking pin which contact the through-hole at the contact locations are of expanding cross-sectional configuration, namely, of expanding cross-sectional shape in an upward direction.

In yet another embodiment of the invention, the head of the locking pin includes a cylindrical portion for engaging the through-hole at one of the contact locations, and an expanding surface portion for engaging the through-hole at the other contact location. The expanding surface portion is of expanding cross-sectional shape in an upward direction.

BRIEF DESCRIPTION OF THE DRAWINGS

The objects and advantages of the invention will become apparent from the following detailed description of a preferred embodiment thereof in connection with the accompanying drawings in which like numerals designate like elements, and in which:

FIGS. 5a–5f are side elevational views of respective alternative shapes of a locking pin according to the invention.

DETAILED DESCRIPTION OF A PREFERRED EMBODIMENT OF THE INVENTION

Figure 1:
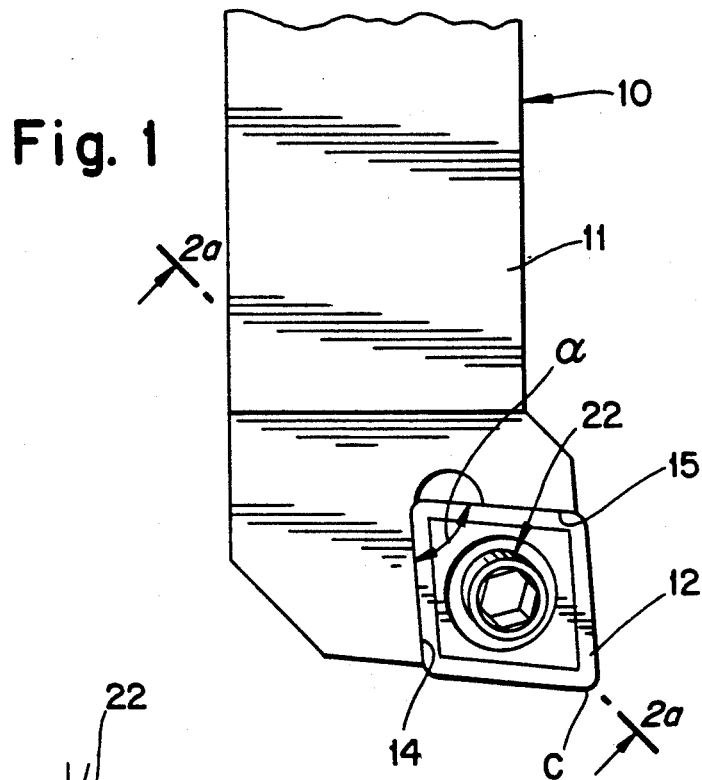
FIG. 1 is a top view of a top view of a cutting tool according to the present invention.

The cutting tool 10 in FIG. 1 includes a holder body 11 that at one end part is provided with a cutting insert receiving site. In the receiving site a cutting insert 12 is located.

Figure 2A:
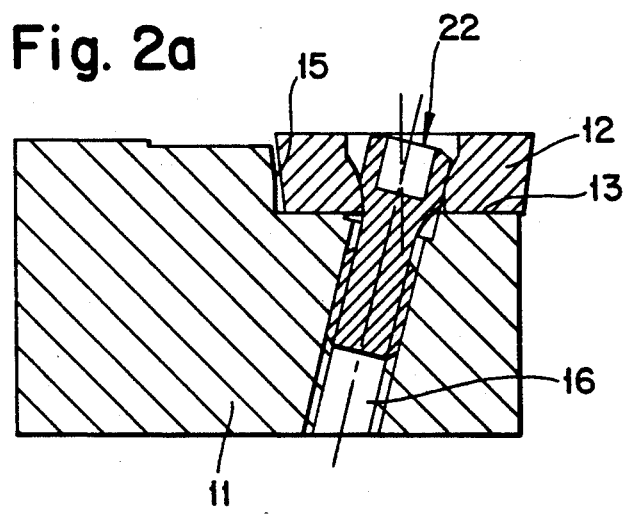
FIG. 2a is a sectional view taken along line 2a—2a in FIG. 1.
Figure 3:
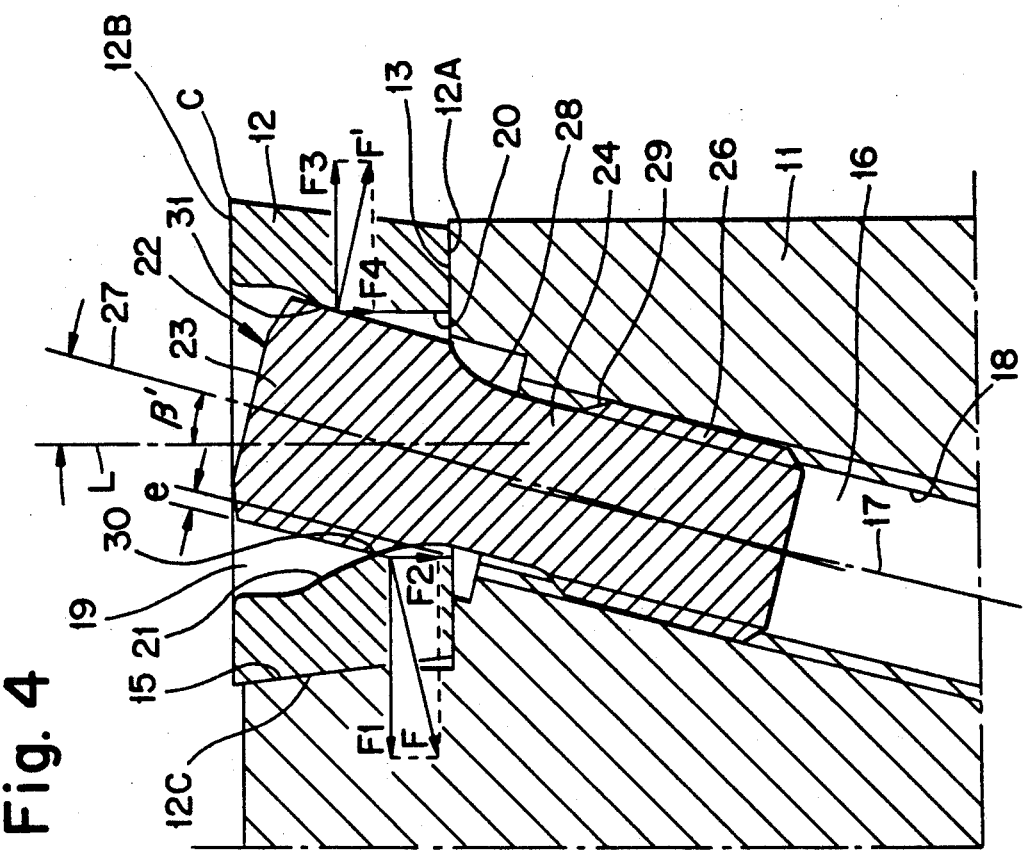
FIG. 3 is a longitudinal sectional view through the cutting tool according to the invention in an initial state of clamping the cutting insert to the holder body.
Figure 4:
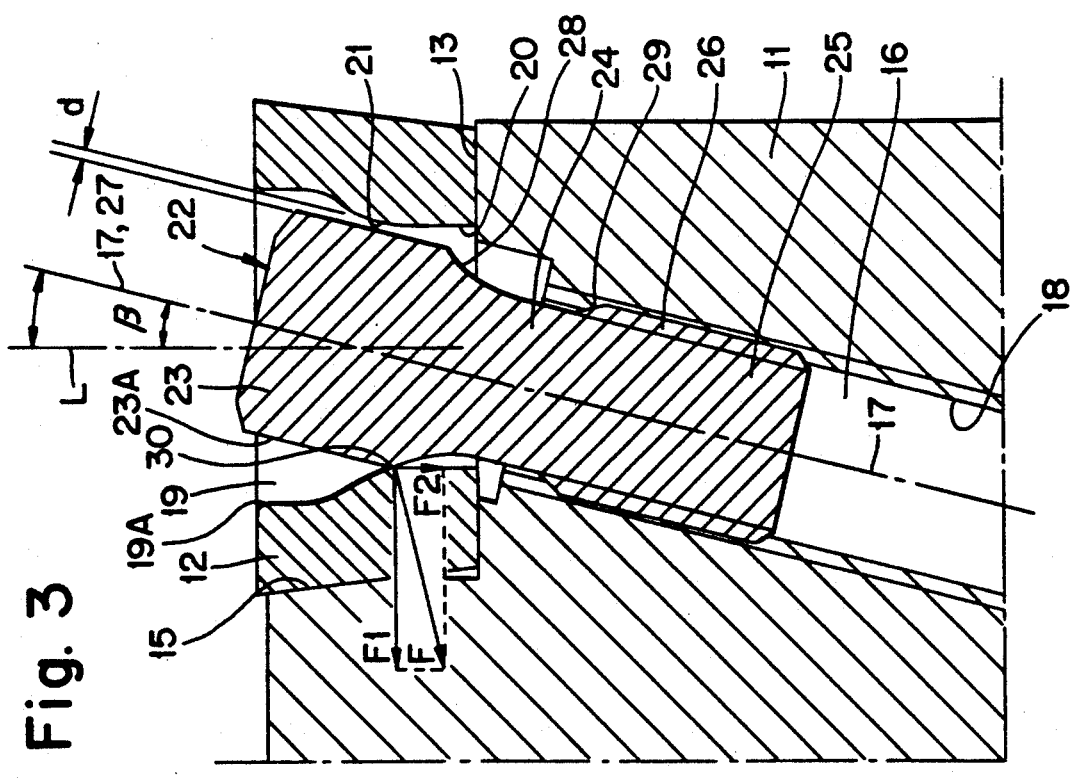
FIG. 4 is a view similar to FIG. 3 in a final state of clamping the cutting insert to the holder body.

In the embodiment according to FIGS. 2a, 3 and 4, the receiving site includes a base surface 13 supporting the cutting insert 12. The receiving site also has side supports for the cutting insert, and as is shown in FIG. 1 the side supports include two side surfaces 14 and 15 extending in a transverse direction relative to the base surface 13. The side surfaces 14 and 15 form an angle $\alpha$ corresponding to an angle of a corner of the cutting insert 12 located in the receiving site. Normally the angle $\alpha$ is in the range of 35°–160°.

In a holder body 11 a hole 16 is provided. That hole 16 extends downwardly through the base surface 13 of the cutting insert receiving site. In the disclosed embodiment, the hole 16 has a circular cross-section, and the longitudinal center axis 17 of the hole 16 is inclined relative to the base surface 13 of the receiving site. The inclination of the longitudinal center axis 17 of the hole 16 is such that the axis 17 diverges outwardly away from the side surfaces 14, 15 as the axis 17 progresses upwardly. An angle $\beta$ is included between the axis 17 and an intersecting line L extending perpendicular to the base surface 13. The angle $\beta$ is in the range of 5° to 30°, preferably about 20°. The hole 16 is provided with an internal screw thread 18.

The cutting insert includes a bottom face 12A which contacts the base surface 13, a top face 12B which includes a least one cutting edge, a side face 12C which contacts the side supporting surfaces 14, 15, and a through-hole or fixing hole 19 extending from the top face to the bottom face.

The through-hole 19 is configured in accordance with conventional standard ISO 6987. Such a through-hole includes a cylindrical lower section 20 and a tapered section 21 extending above the lower section. The tapered section 21 is of expanding cross-section in the upward direction. The upper portion 19A of the hole can be of any suitable shape.

According to the requirements of the standard, the taper of the section 21 is such as to permit use of a head screw having a head taper angle between 40° and 60°. However, as will be explained hereinafter, the present invention intends that a different type of screw is used which enables inserts to be exchanged without completely removing the screw.

The locking screw 22 according to the invention is adapted to clamp the cutting insert 12 within the cutting insert receiving site of the holder body 11 of the cutting tool 10. In the shown embodiment, the locking screw 22 includes a head 23 having a cylindrical outer surface 23A, an intermediate portion 24 and a cylindrical shaft 25 that is provided with an external screw thread 26. The locking screw has a longitudinal center axis 27. The thread 26 is dimensioned so as to cooperate with the internal thread 18 of the hole 16. Preferably there is a limited transverse (radial) clearance between the respective tips and roots of the threads 18 and 26. This means that, until tightened, the locking screw 22 may float laterally by a limited distance and assume a tilted position, as will be hereinafter explained.

In the shown embodiment, the intermediate portion 24 has a minimum diameter smaller than that of both the head 23 and the shaft 25. A first transition portion 28 extends between the head 23 and the intermediate portion 24 and a second transition portion 29 extends between the shaft 25 and the intermediate portion 24. Those transition portions 28, 29 are smoothly curved in the shown embodiment. However, within the scope of the invention other designs are also possible, e.g., the transitions portions 28, 29 may be frusto-conical.

An intersection portion 30 between the cylindrical head 23 and the first transition portion 28 is of a relatively sharp profile. That intersection portion, or lower contact portion, will be active in the clamping of the cutting insert 12.

As shown in FIG. 4, there exists a distance e defined by two lines parallel with the center axis 27, one line extending through the lower contact portion 30 and the other line extending through the intersection between the inner part of the lower end of the hole 19 and the base surface 13. That distance e is greater than zero, since otherwise the head 23 of the locking screw 22 would slide through the hole 19 when displaced axially downwards.

With reference to FIGS. 3 and 4, the clamping function of the cutting tool 10 according to the present invention will be described below.

A basic idea of the present invention is that a cutting insert with the above-described fixing hole can be exchanged without completely removing the locking screw 22 from the holder body 11. In fact, only a limited axial displacement of the locking screw 22 is needed to allow the cutting insert 12 to be mounted or removed. When a cutting insert 12 is mounted or removed, the locking screw 22 is displaced axially upwards from the state shown in FIG. 3. However, it is only necessary to displace the locking screw 22 axially upwards so much that the cutting insert 12 can pass between the side walls 14, 15 and the lower contact portion 30 of the head 2 of the locking screw 22.

When a cutting insert 12 is seated on the receiving site, the locking screw 22 is rotated in a given direction. By cooperation of the internal and external threads 18 and 26, a displacement axially downwards of the locking screw 22 will take place. In FIG. 3, the locking screw 22 is shown in a state where the lower or first contact portion 30 has just entered into contact with the decreasing cross-sectional portion 21 of the fixing hole 19 to define a lower or first contact location. In this state, the longitudinal center axis 27 of the locking screw 22 coincides with the longitudinal center axis 17 of the hole 16. FIG. 3 shows the components $F_1$, $F_2$ of the force F that the first contact portion 30 exerts upon the cutting insert 12 thus forcing the inner portion (i.e., left portion in FIG. 3) of the cutting insert 12 laterally inwards towards the side support surfaces 14, 15 by the force component $F_1$ and longitudinally inwards towards the base surface 13 by the force component $F_2$. Between the outer portion of the fixing hole 19 and the head 23 there is a small gap d in the range of 0 to 1.0 mm, preferably 0 to 0.5 mm. According to a most preferred embodiment of the invention, the gap d is in the magnitude of 0.2 mm.

Figure 4A:
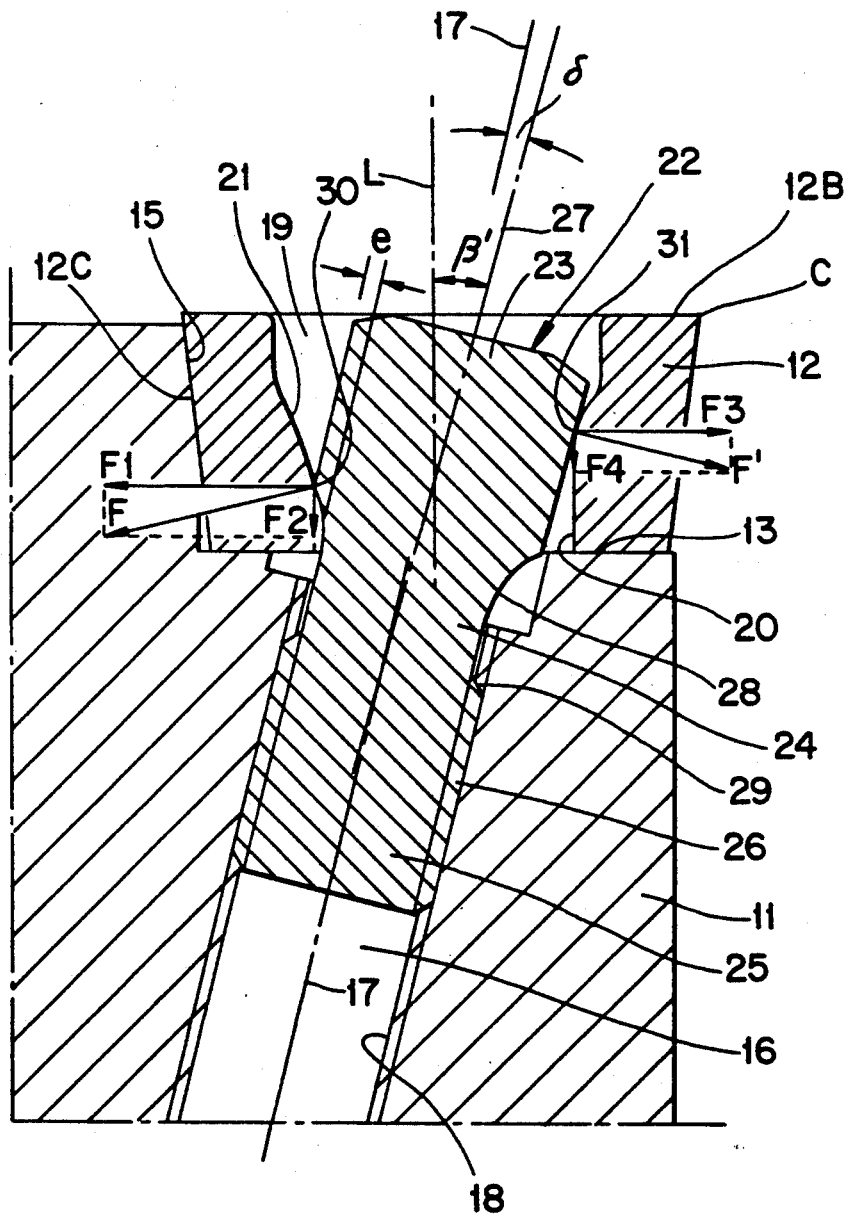
FIGS. 4A is a view similar to FIG. 4 depicting an alternative final state of clamping according to the invention.

A further longitudinally inward displacement of the locking screw 22, effected by rotation of the locking screw 22 in a given direction, will bring the cutting tool 10 to the state shown in FIG. 4. Such further displacement will cause the locking screw 22 to tilt laterally outwards, i.e., from the intersection between the side walls 14, 15. Such tilting is permitted by the afore-mentioned transverse clearance between the threads 18 and 26. Alternatively, such tilting could be permitted by an elastic deformation (bending) of head 23 of the locking screw 22 relative to the shaft 25, as shown in FIG. 4A. Note that the absence of clearance between the threads 18, 26 causes the axis 27 of the head of the screw to bend and form an angle $\delta$ relative to the axis 27 of the hole 16.

Once the tilting has taken place (see FIG. 4), the longitudinal center axis 27 of the locking screw 22 will no longer coincide with the longitudinal center axis 17 of the hole 16. This means that the angle $\beta'$ included between the intersecting line L and the longitudinal center axis 27 of the locking screw 22 in FIG. 4 is larger than the angle $\beta$ in FIG. 3. Preferably, that angle increase is in the magnitude of 2°.

The tilting of the locking screw 22 produces an additional clamping effect in that an upper or second contact portion 31 of the cylindrical head 23 of the locking screw 22 contacts the decreasing cross-sectional portion 21 of the fixing hole 19 of the cutting insert 12 to define an upper or second contact location which is located diametrically opposite the first contact location and farther from the side supporting surfaces 14, 15 than the lower contact location. As is shown in FIG. 4, the cylindrical head 23 exerts a force F' having a force component $F_3$ acting upon the cutting insert 12 in a laterally outward direction and a force component $F_4$ acting upon the cutting insert in a longitudinally inward direction. The force $F_3$ is smaller than the force $F_1$ so that the insert remains pressed against the surfaces 14, 15 The presence of the force $F_4$ is very important in that it prevents a raising of the outer cutting corner c of the cutting insert 12 away from the base surface 13.

In the shown embodiment, the head 23 of the locking screw 22 is cylindrical, i.e., the head 23 has a constant radial dimension relative to its longitudinal center axis 27. However, within the scope of the present invention it is also possible that the head of the locking screw at the area of its upper contact portion 31 could have a widening cross-section in a longitudinally outwards direction, i.e., towards the free end of the head of the locking screw (see FIG. 5b for example). From FIGS. 5a-5f, it is apparent that the shape of the head 23a-23f can be varied in many different ways within the scope of the present invention. However, in the area of the upper contact portion 31, the head should either be cylindrical or have a widening cross-section in a longitudinally outward direction.

In this connection it should also be pointed out that the lower contact portion 30 does not need to be of a sharp (corner-forming) profile. As exemplified in FIGS. 5a-5f, other designs are possible within the scope of the present invention as long as a good contact is established between the lower contact portion 30 and the hole 19 of the cutting insert 12.

Figure 2B:
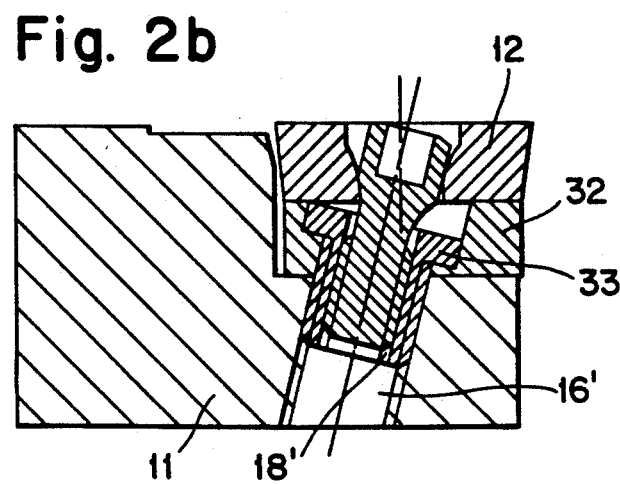
FIG. 2b is a view similar to FIG. 2a of an alternative embodiment.

The embodiment shown in FIG. 2b corresponds to the embodiment described in FIGS. 1, 2, 3 and 4 with the following differences. A shim 32 is located between the cutting insert 12 and the cutting insert receiving site. That shim 32 is fixed to the holder body 11 by means of an externally and internally threaded sleeve 33 that is mounted in an internally threaded hole 16'. The internal thread 18' of the sleeve 33 functions in a way corresponding to the upper portion of the internal thread 18 of the hole 16 in the earlier-described embodiment.

In the described embodiments, the locking pin is in the shape of a rotatable locking screw. However, within the scope of the present invention it is also possible that the locking pin is of a non-rotating type, i.e., the locking pin is displaceable in an axial direction without being rotated.

The present invention is primarily intended to be used in connection with cutting inserts having a positive basic shape. However, the principles of the invention can also be used in connection with cutting inserts having a negative basic shape.

Alternative embodiments of the locking pin are depicted in FIGS. 5a-5f, respectively. FIG. 5a depicts a locking pin similar to that disclosed in connection with FIGS. 1-4, except that the upper end of the head 123 of the locking pin is not beveled. That is, the head includes a cylindrical outer surface 123A which engages the through-hole at both of the contact locations.

In FIG. 5b, the head 223 of the locking pin includes two expanding surfaces 223A, 223B which engage the through-hole at the first and second contact locations, respectively.

In FIG. 5c, the head 323 includes a cylindrical surface 323A which engages the through-hole at the first contact location, and an expanding surface 323B which contacts the through-hole at the second contact location.

In FIG. 5d, the head 423 includes an expanding outer surface 423A which engages the through-hole at both of the contact locations.

In FIG. 5e, the head 523 includes a smoothly expanding surface 523A which engages the through-hole at the first contact location, and a smoothly rounded second expanded surface 523B located thereabove for contacting the through-hole at the second contact location.

FIG. 5f shows a head 623 which is similar to that depicted in FIG. 5d, except that the upper end of the outer surface of the head is generally rounded at 623B.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A cutting tool for chip removing machining, comprising:

a holder body having an insert-receiving site including a base surface, side supporting surface means extending upwardly from said base surface, and an aperture extending downwardly through said base surface and being inclined toward said side supporting surface means, a cutting insert seated on said site and including a bottom face engaging said base surface, side face means supported by said side supporting surface means, and a top face having at least one cutting edge, a through-hole extending through said insert from said top face to said bottom face, said through-hole including a cylindrical section and a tapered section disposed above said cylindrical section, said tapered section of progressively reduced cross-section in a downward direction, and a locking pin insertable through said through-hole and securable in said aperture for releasably securing said insert to said holder and permitting said insert to be removed from, and seated upon, said site without completely detaching said pin from said holder, said pin including a shank receivable in said aperture, and a head receivable in said through-hole, said head including a first cylindrical portion and a transition surface disposed therebelow, said transition surface being of upwardly expanding cross section, an intersection of said transition surface and said first cylindrical portion pressing against said tapered section of said through-hole at a first contact location disposed proximate said side supporting surface means, said head including a second cylindrical portion pressing against said tapered section at a second contact location situated above and diametrically opposite said first contact location, said second contact location being disposed remotely from said side supporting means, said second cylindrical lower ends by said tapered section of said through-hole, said second contact location being disposed below said top surface, said head applying a force to said insert at each of said contact locations, each of said forces including a downward component.

2. A cutting tool according to claim 1, wherein said looking pin comprises a screw threadedly secured in said aperture.

3. A cutting tool according to claim 2, wherein there is a transverse clearance between a screw thread of said locking pin and a screw thread of said aperture to enable said pin to tilt relative to said aperture.

4. A cutting tool according to claim 1, wherein said locking pin is elastically bent during installation such that a longitudinal axis of said head is non-aligned relative to a longitudinal axis of said shank.

5. A cutting tool according to claim 1, wherein said aperture is circular and forms an angle in the range of 5 to 30 degrees relative to a longitudinal axis of said through-hole.

6. A cutting tool according to claim 5, wherein said angle is about 20 degrees.

7. A cutting tool according to claim 1, wherein said through-hole includes a cylindrical section extending from a lower end of said tapered section to said bottom face.

8. A cutting tool for chip removing machining, comprising:

a holder body having an insert-receiving site including a base surface, side supporting surface means extending upwardly from said base surface and an aperture extending downwardly through said base surface and being inclined toward said side supporting surface means, a cutting insert seated on said site and including a bottom face supported by said base surface, side face means supported by said side supporting surface means, and a top face having at least one cutting edge, a through-hole extending through said insert from said top face to said bottom face, said through-hole including a lower cylindrical section and a tapered section disposed above said cylindrical section and being of progressively reduced cross-section in a downward direction, and a locking pin insertable through said through-hole and securable in said aperture for releasably securing said insert to said holder and permitting said insert to be removed from, and seated upon, said site without completely detaching said pin from said holder, said pin including a head receivable in said hole, said head pressing against said tapered portion of said hole at diametrically opposite contact locations, one of said contact locations being disposed proximate said side supporting surface means, and another of said contact locations disposed remotely from said side supporting means, said head having an expanding surface portion at each of said contact locations, said expanding surface portion having a progressively expanding cross-section in an upward direction, said head applying to said insert at each of said contact locations a force having a downward component, said other contact location being situated closer to said top face than is said one contact surface.

9. A cutting tool according to claim 8, wherein said locking pin comprises a screw threadedly secured in said aperture.

10. A cutting tool according to claim 9, wherein there is a transverse clearance between a screw thread of said locking pin and a screw thread of said aperture to enable said pin to tilt relative to said aperture.

11. A cutting tool according to claim 9, wherein said locking pin is elastically bent during installation such that a longitudinal axis of said head is non-aligned relative to a longitudinal axis of said shank.

12. A cutting tool according to claim 9, wherein said aperture is circular and forms an angle in the range of 5 to 30 degrees relative to a longitudinal axis of said through-hole.

13. A cutting tool for chip removing machining, comprising:

a holder body having an insert-receiving site including a base surface, side supporting surface means extending upwardly from said base surface, and an aperture extending downwardly through said base surface and being inclined toward said side supporting surface means, a cutting insert seated on said site and including a bottom face engaging said base surface, side face means engaging said side supporting surface means, and a top face having at least one cutting edge, a through-hole extending through said insert from said top face to said bottom face, said through-hole including a lower cylindrical section and a tapered section disposed above said cylindrical section and being of progressively reduced cross-section in a downward direction, and a locking pin insertable through said through-hole and securable in said aperture for releasably securing said insert to said holder and permitting said insert to be removed from, and seated upon, said site without completely detaching said pin from said holder, said pin including a shank receivable in said aperture, and a head receivable in said hole, said head including a cylindrically shaped surface portion, an expanding surface portion located thereabove and having a progressively expanding cross-section in an upward direction, and a transition surface located below said cylindrically shaped surface portion, said transition surface expanding upwardly, an intersection of said transition surface and said cylindrically shaped surface portion pressing against said tapered section of said through-hole at a first contact location, said expanding surface portion pressing against said tapered section of said through-hole at a second contact location spaced diametrically opposite said first contact location, one of said contact locations being disposed proximate said side supporting surface means, and another of said contact locations disposed remotely from said side supporting means, said head applying a force to said insert at each of said contact locations, each of said forces including a downward component.

14. A cutting tool for chip removing machining, comprising:
   a holder body having an insert-receiving site including a base surface, side supporting surface means extending upwardly from said base surface, and an aperture extending downwardly through said base surface and being inclined toward said side supporting surface means,
   a cutting insert seated on said site and including a bottom face supported by said base surface, side face means supported by said side supporting surface means, and a top face having at least one cutting edge, a through-hole extending through said insert from said top face to said bottom face, said through-hole including a tapered section of progressively reduced cross-section in a downward direction, and
   a locking pin insertable through said through-hole and securable in said aperture for releasably securing said insert to said holder and permitting said insert to be removed from, and seated upon, said site without completely detaching said pin from said holder, said pin including a shank receivable in said aperture, and a head receivable in said through-hole, said head including first and second cylindrically shaped surface portions, said head including a transition surface disposed below said first cylindrically shaped portion, an intersection of said transition surface and said first cylindrically shaped surface portion pressing against said tapered section of said through-hole at a first contact location, said second cylindrically shaped surface portion pressing against said tapered section at a second contact location, said first contact location being disposed proximate said side supporting surface means, and said second contact location being disposed remotely from said side supporting means, said head applying a force to said insert at each of said contact locations, each of said forces including a downward component, said locking pin being elastically bent during installation such that a longitudinal axis of said head is non-aligned relative to a longitudinal axis of said shank.

15. A cutting tool for chip removing machining, comprising:
   a holder body having an insert-receiving site including a base surface, side supporting surface means extending upwardly from said base surface, and an aperture extending downwardly through said base surface and being inclined toward said side supporting surface means,
   a cutting insert seated on said site and including a bottom face supported by said base surface, side face means supported by said side supporting surface means, and a top face having at least one cutting edge, a through-hole extending through said insert from said top face to said bottom face, said through-hole including a tapered section of progressively reduced cross-section in a downward direction, and
   said apertures being circular and forming an angle of about 20 degrees relative to a longitudinal axis of said through-hole, and
   a locking pin insertable through said through-hole and securable in said aperture for releasably securing said insert to said holder and permitting said insert to be removed from, and seated upon, said site without completely detaching said pin from said holder, said pin including a shank receivable in said aperture, and a head receivable in said through-hole, said head including first and second cylindrically shaped surface portions, said head including a transition surface disposed below said first cylindrically shaped portion, an intersection of said transition surface and said first cylindrically shaped surface portion pressing against said tapered section of said through-hole at a first contact location, said second cylindrically shaped surface portion pressing against said tapered section at a second contact location, said first contact location being disposed proximate said side supporting surface means, and said second contact location being disposed remotely from said side supporting means, said head applying a force to said insert at each of said contact locations, each of said forces being elastically bent during installation such that a longitudinal axis of said head is non-aligned relative to a longitudinal axis of said shank.

16. A cutting tool for chip removing machining, comprising:
   a holder body having an insert-receiving site including a base surface, side supporting surface means extending upwardly from said base surface and an aperture extending downwardly through said base surface and being inclined toward said side supporting surface means,
   a cutting insert seated on said site and including a bottom face engaging said base surface, side face means engaging said side supporting surface means, and a top face having at least one cutting edge, a through-hole extending through said insert from said top face to said bottom face, said through-hole including a lower cylindrical section and a tapered section disposed above said cylindrical section and being of progressively reduced cross-section in a downward direction,
   aperture being circular and forming an angle of about 20 degrees relative to a longitudinal axis of said through-hole, and
   a locking pin insertable through said through-hole and securable in said aperture for releasably securing said insert to said holder and permitting said insert to be removed from, and seated upon, said site without completely detaching said pin from said holder, said pin including a head receivable in said hole, said head pressing against said tapered portion of said hole at diametrically opposite contact locations, one of said contact locations being disposed proximate said side supporting surface means, and another of said contact locations disposed remotely from said side supporting means, said head having an expanding surface portion at each of said contact locations, said expanding surface portion having a progressively expanding cross-section in an upward direction, said head applying to said insert at each of said contact locations a force having a downward component.

* * * * *